Feb. 6, 1940. J. PÜSCHNER ET AL 2,188,985
DEVICE FOR PRODUCING SEPARABLE FASTENERS
Filed July 22, 1936
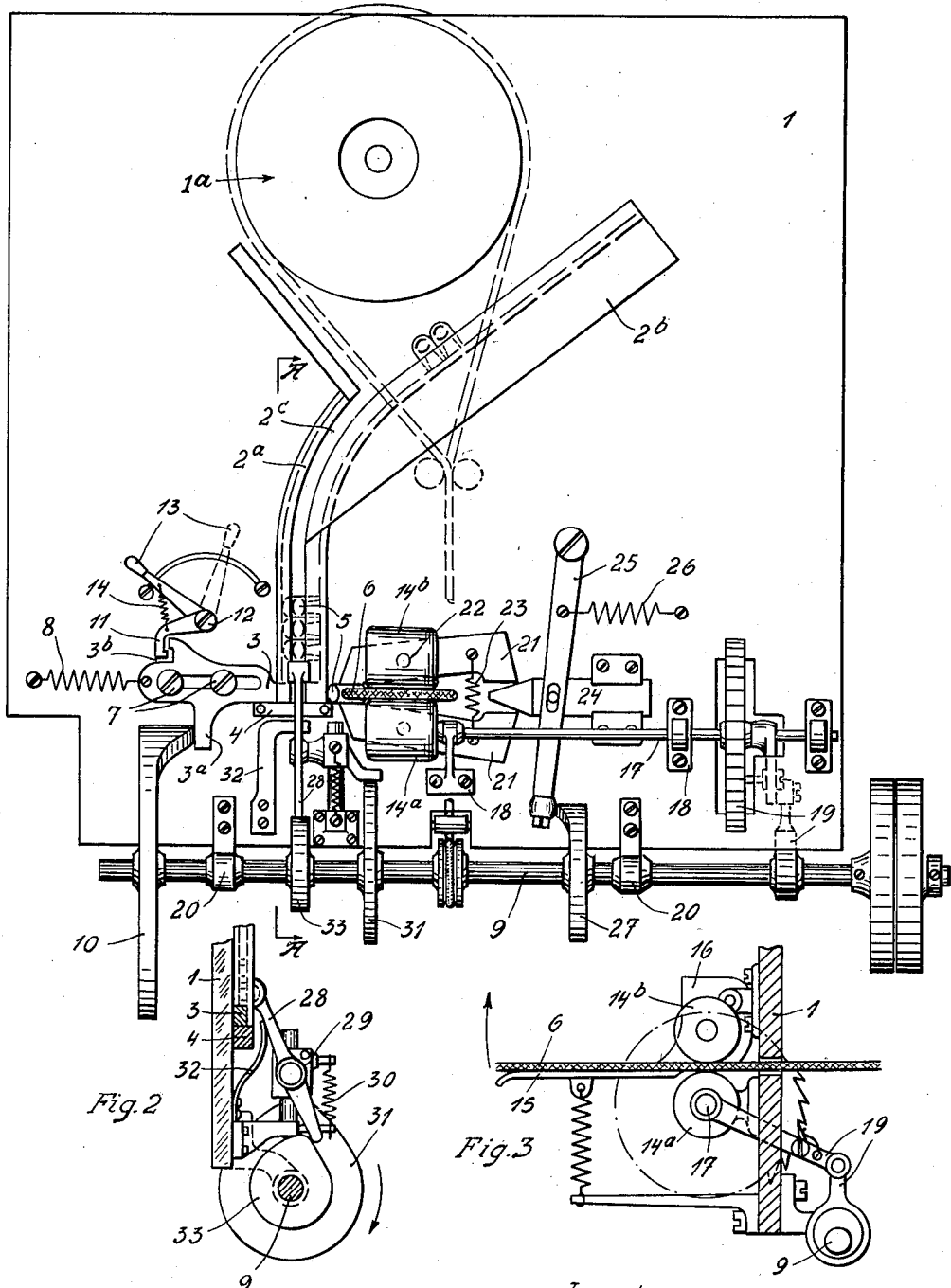
Inventors
Julius Püschner
Josef Püschner
ATTORNEY: Maxwell E. Sparrow Patented Feb. 6, 1940

2,188,985

UNITED STATES PATENT OFFICE 2,188,985

DEVICE FOR PRODUCING SEPARABLE FASTENERS

Julius Püschner and Josef Püschner, near Bodenbach, Czechoslovakia, assignors, by mesne assignments, of one-half to Leo Bauer and one-half to Florence Dupont-Munter, both of New York, N. Y.

Application July 22, 1936, Serial No. 91,808
In Czechoslovakia November 22, 1935

10 Claims. (Cl. 153—1)

This invention relates to a device for distributing separable fastener elements and securing the same to a stringer or tape and in which device the fastener elements irregularly arranged in a container are guided to the band or stringer through a chute after having been previously straightened out. Such container is disclosed by French Patent No. 717,169, delivered Oct. 19, 1931, and published January 5, 1932.

Devices of this class are already known, but practically without exception they are quite extensive, complex and sensitive constructions which in operation are frequently clogged and therefore must be stopped for shorter or longer periods to overcome this difficulty. In these known devices if the legs of the fastening elements guided therein differ in length, the elements are caused to occupy an inclined position and to become jammed in the chute due to the fact that each element engages with its legs the front side of the preceding element and is guided only by pointlike portions of its laterally extending legs in the chute. The chute, therefore, becomes clogged thereby interfering with the continuous, efficient operation of the device. In fasteners made by known devices it can frequently be observed that the fastening elements are unevenly arranged on the band, whereby proper functioning of the fastener is interfered with.

The invention eliminates these disadvantages by providing a device which is extremely simple, low-priced and insensitive, so that it cannot become clogged as easily as in presently constructed machines.

An object of the invention is to provide for guiding and conveying the fastening elements as usual with their projections in a longitudinal slot of the chute, but in transverse position, i. e., their top side and the ends of their legs are guided on the sides of the chute. To this end at the outlet of the chute, a slide guided in a channel extending transversely to the chute is provided which during its forward motion takes along the lowermost fastening element from the chute, which during the preceding return motion of the slide has dropped from the chute into the channel, and presses it upon a band guided laterally past the chute and intermittently moved by rolls, whereupon the element is secured to the band in a known manner by compressing its legs by means of jaws. The transverse arrangement of the fastening elements in the chute with their longitudinal axes disposed vertically to the longitudinal direction of the chute insures better guiding thereof, so that differences in the length of the legs are immaterial and the chute cannot become clogged so easily. The pushing out of the lowermost fastening element from the chute, rendered necessary by the special position of the elements in the chute, insures uniform arrangement of the elements on the band under corresponding pressure, and the fasteners made on this machine are therefore uniform and function properly. The novel manner of conveying the fastening elements in the chute makes it possible to dispose all parts of the device in a common plane and to secure them jointly to a vertical plate through which the band passes.

By way of example, the invention is illustrated in the accompanying drawing, in which Figure 1 is a front view of the device; Fig. 2, a cross section on the line A—A, Fig. 1; and Fig. 3, a side view of the band conveying and guiding means.

Referring to the drawing, the numeral I represents a vertical plate to which the bars 2a, 2b of angular cross section are secured parallel to one another in such manner that between them a gap 2c remains and a channel is formed by them on the plate I. The width of this channel is equal to the length of one of the fastening elements to be worked, and the width of the gap or slot between the two bars 2a, 2b corresponds to the width of an elevation of a fastening element measured in the longitudinal direction thereof. The lower portion of the bars 2a, 2b extends in vertical direction whilst the upper portion thereof is somewhat inclined relative to the horizontal, both portions forming a gentle curve at the point of transition.

The bar 2b projects on top to a considerable distance beyond the bar 2a for receiving individual fastening elements which drop out of a container Ia secured to the upper end of the plate I. The container Ia holds a large supply of irregularly arranged fastening elements and is so constructed that if rotation or a shaking motion is imparted to it the elements will successively come out with their projections on the side averted from the plate I. The bar 2b having an angular cross section forms a channel facing the container Ia, and the elements on dropping out strike with their projections the upwardly directed edge of the side of the bar 2b that is parallel with the plate I while the legs of the elements enter the channel referred to, possibly by rotating the elements about their projection held by the edge of the bar 2b. Owing to the inclination of the bar 2b, the fastening elements riding with their projections in engagement with edge of this bar slide downwardly and in such manner that, upon further guidance of the projections by the bar 2a, the elements pass into the vertical part of the channel formed by these bars 2a, 2b. During their downward course the elements are thus transversely arranged and while in this position, they are guided into the discharge chute in this transverse position, that is, with their narrow top side and the ends of their legs in this position.

At the outlet of the chute formed by the bars 2a, 2b a slide 3 transversely movable to the chute and closing it, is arranged, which slides on a rail 4 and is partly embraced by the bars 2a, 2b. The slide 3 corresponds in width and thickness to a fastening element 5. When the slide 3 is withdrawn, the outlet of the chute is open and the lowermost element in the latter can drop into the channel formed by the rail 4 and the top of the bars 2a, 2b. During return of the slide 3 into position closing the outlet of the chute the element previously positioned in the channel is moved forwardly in the direction of the band 6, the latter being arranged laterally of the chute 2a, 2b and movable vertically thereto. The band is then embraced by the legs of the fastening element 5.

The slide 3 is slotted and guided by the screws 7 which also secure it to the plate 1. It is further subjected to the action of a spring 8 which continually draws a nose 3a against a cam disc 10 disposed on the shaft 9, the slide 3 being once withdrawn from and returned to the channel at each rotation of the shaft 9. When in the position for closing the outlet of the chute 2a, 2b, the slide 3 may be locked by a hooked pawl 11 swingably disposed on a pin 12 with its free end engaging a rest 3b of the slide 3. The pin 12 further carries a hand lever 13 which is coupled with the pawl 11 by means of the spring 14 and serves for engaging and disengaging the pawl 11. The arrangement is such that the slide 3 even if locked is still slightly moved by the cam disc 10 and that the pawl 11 can be lifted only if the slide 3 is pushed into extreme right-hand position. A disengaging motion of the lever 13 is therefore not immediately followed by the pawl 11, but the latter is moved only when the locked slide 3 is pushed somewhat to the right by the cam disc 10. The purpose of this arrangement will become apparent later on.

The band 6 extends perpendicularly to the plate 1 and is tightly passed through an opening thereof. It is conducted between a pair of rolls 14a, 14b, the roll 14b pressing by its own weight against the roll 14a while the latter is rotated stepwise. The band 6 further slides on a track 15 vertically disposed to the plate 1 and upwardly tiltably secured to the plate 1 by means of a carrier 16 in which the roll 14b is rotatably disposed. Lifting of the track 15 causes the roll 14b to be lifted off from the roll 14a arranged on a shaft 17 which latter is disposed on the plate 1 by means of the bearing 18 and connected with the shaft 9 by means of a gearing 19. The shaft 9 is also disposed on the plate 1 by means of bearings 20 and driven in suitable manner, and the shaft 17 is controlled by the shaft 9 in such manner that the band 6 stands still when the slide 3 presses a fastening element coming from the chute 2a, 2b upon it.

The edge of the band 6 facing the chute 2a, 2b projects to a certain extent beyond the rolls 14a, 14b which have a relatively small diameter to keep the point where they engage the band 6 as closely as possible to the plate 1. In this way the band 6 is held very tightly between the roll and the wall so as to offer sufficient resistance to the fastening element that is pushed upon it. Two levers 21 cooperating like a clamp are rotatably disposed at 22 on the plate 1 in such manner that they extend approximately perpendicularly to the chute 2a, 2b and the end facing the chute is exactly located at the point where the slide 3 pushes a fastening element onto the band 6. With this end the two levers 21 form a jaw which is usually kept open by a spring 23 and in which the fastening element to be attached to the band is arranged. Between the opposite ends of the levers 21 engages the wedgelike end of a slide 24 which can be moved to and fro by a lever 25. The slides 3 and 24 are disposed in the same axis. The free end of the lever 25 is drawn by the spring 26 against a cam disc 27 on the shaft 9, which reciprocates the slide 24. Owing to the reciprocating motion of the wedgelike point of the slide 24 between the ends of the levers 21 and to the action of the spring 23, the jaw of the levers 21, which faces the chute 2a, 2b, is opened and closed, the closing motion being carried out to such an extent that the levers 21 compress the legs of the fastening element held between them and thus clamp the element to the band 6. This clamping action occurs immediately after a fastening element has been pushed upon the band 6 and while the latter stands still.

The feed gearing 19 is variable, and the travel of the band 6 can be adjusted so that the fastening elements can be arranged thereon at the distance required for proper functioning. By lifting the track 15 and the consequent raising of the band roll 14b feeding of the band can be interrupted to allow free motion thereof for the purpose of keeping portions of the band free from fastening elements. During this time the operation of the slide is interrupted by the engagement of the pawl 11.

To insure proper positioning of the lowermost element in the chute 2a, 2b in the channel and to prevent jamming of the member therein while it is advanced by the slide 3 a finger 28 is provided which grips the lowermost member and draws it into the channel during motion of the slide 3 to the left in Fig. 1. The finger 28 is constructed as a two-armed lever and disposed on a carrier 29 which is displaceably arranged in suitable manner parallel to the chute 2a, 2b and drawn by a spring 30 against a cam disc 31 to be moved up and down thereby in a certain rhythm. The upper end of the finger 28 is so constructed that it can pass through the slot 2c of the chute 2a, 2b. The face of the lever 28 abutting against the chute is provided with a small cavity which is engaged by the projection of a fastening element. The lowermost element in the chute gripped by the finger 28 is thus taken along during the descent of the carrier 29 and of the finger 28 and guided into the channel. The lower end of the leverlike finger 28, owing to the action of a spring 32, rests on a cam 33 of the shaft 9, which controls the finger 28 so that the upper end thereof abuts against the chute 2a, 2b only at the end of the upward motion of the lever and during the descent thereof.

From the foregoing there can readily be seen that there has herein been disclosed a device for distributing and securing fastener elements to a stringer or tape which device is provided with a receptacle for delivering fastener elements into a chute having an outlet and characterized in that there is provided a vertically arranged chute adapted to slidably receive the fastener elements in transverse position, and a member horizontally disposed adjacent the outlet and fixedly located at a distance therefrom corresponding substantially to the maximum width of one of said elements, said member and said outlet providing a channel extending transversely of said chute, a reciprocable part movable on said member for forwardly moving a fastener element when located in said channel, and clamping means adjacent said chute for securing a fastener element moved by said part to a strip of material, said part and said clamping means being adjacent opposite sides of said chute, said strip being transported in a substantially horizontal plane.

Having thus described the invention, what is claimed as new and desired to be secured by Letters Patent, is:

1. In a device of the character described having a stock container for delivering fastening elements into a chute, the combination of a chute for receiving the said fastening elements from the container, said chute being so constructed and of such width for permitting the fastening elements to drop down therein in transverse position, with a bar disposed adjacent the front of the outlet of the chute at a distance corresponding to the maximum width of one of said fastening elements and forming a channel extending transversely of the chute, a spring actuated reciprocatable slide arranged on one side of the chute and movable transversely of the axis of the chute for forwardly moving one of said fastening elements located in the channel, a cam disc for moving the spring-actuated slide into the channel, a device for holding the slide in the channel, said device permitting slight motions of the slide by means of the cam disc and being releasable only at the extreme end position of the slide, a pair of presser jaws positioned on the other side of the chute, a pair of rolls adjacent said jaws for intermittently moving a band, upon which the said fastening elements are to be fixed, transversely of the chute, and means for moving the container and cam disc, and means for intermittently actuating the presser jaws and rolls.

2. In a device of the character described having a stock container for delivering fastening elements into a chute, the combination of a chute for receiving the said fastening elements from the container, said chute being so constructed and of such width for permitting the fastening elements to drop down therein in transverse position, a bar disposed adjacent the front of the outlet of the chute at a distance corresponding to the maximum width of one of said fastening elements and forming a channel extending transversely of the chute, a swinging gripper movable for intermittent engagement with the lowermost fastening element in the chute for facilitating withdrawal thereof from without the chute into the channel, a reciprocatable slide arranged on one side of the chute and movable transversely of the axis of the chute for forwardly moving a fastening element located in the channel, means including a cam disc for moving the slide into the channel, a device for holding the slide in the channel, said device permitting slight motions of the slide by means of the cam disc and being releasable only at the extreme end position of the slide, a pair of presser jaws positioned on the other side of the chute, a pair of rolls adjacent said jaws for intermittently moving the band, upon which the said fastening elements are to be fixed, in a horizontal plane transversely of the chute, and means for moving the container and the cam disc and intermittently actuating the presser jaws, gripper and rolls, all said parts being arranged on a vertically disposed plate.

3. In a device of the character described having a stock container for delivering fastening elements into a chute, the combination of a chute for receiving the said fastening elements from the container, said chute being so constructed and of such width for permitting the fastening elements to drop down therein in transverse position, a bar disposed adjacent the front of the outlet of the chute at a distance corresponding to the maximum width of one of said fastening elements and forming a channel extending transversely of the chute, a reciprocatable slide arranged on one side of the chute and movable transversely of the axis of the chute for forwardly moving one of said fastening elements located in the channel, a pair of presser jaws positioned on the other side of the chute, a pair of rolls adjacent said jaws for intermittently moving a band, upon which the said fastening elements are to be fixed, in a horizontal plane transversely of the chute, means for intermittently actuating the slide, presser jaws, and rolls, a plate to which all of the said parts are secured, said plate having a slot adapted for the passing of said band, and an upwardly tiltable track for supporting said band and arranged on said plate in substantially perpendicular relation thereto with respect thereto, one of said rolls being disposed on said track and liftable from the other of said rolls by means of said track.

4. In a device of the character described having a stock container for delivering fastening elements into a chute, the combination of a chute for receiving said fastening elements from said container, said chute being so constructed and of such width for permitting said fastening elements to drop down therein in transverse position, a bar disposed adjacent the outlet of said chute at a distance corresponding to the maximum width of one of said fastening elements and extending transversely of said chute, a reciprocable slide arranged on one side of said chute and movable on said bar transversely of the axis of said chute, a pair of pressure jaws positioned on the other side of said chute, a pair of rolls adjacent said jaws for intermittently moving a band in a horizontal plane transversely of said chute, said slide being arranged for forwardly moving the lowermost of said fastening elements located on said bar toward said band upon which the said lowermost fastening element is to be fixed, and means for intermittently actuating said slide, said jaws and said rolls.

5. In a device of the character described provided with a stock container for delivering fastening elements into a chute having an outlet, the combination of a chute for guiding said fastening elements from the container, said chute being so constructed and of such width for permitting the fastening elements to drop down therein in transverse position, a bar fixedly disposed adjacent said outlet at a distance corresponding to the maximum width of one of said fastening elements and extending transversely of said chute, a swinging member in front of said chute and movable for intermittent engagement with the lowermost fastening element in the chute for facilitating successive movement of said elements out of said chute to said bar, a reciprocable slide arranged on one side of said chute and movable on said bar transversely of the axis of said chute for forwardly moving said lowermost fastening element on said bar, a pair of pressure jaws positioned on the other side of said chute, a pair of rolls adjacent said jaws for intermittently moving a band in a horizontal plane transversely of said chute, said band being provided with an edge, upon which the said fastening elements are to be fixed, projecting beyond the lateral edges of said rolls, and means for intermittently actuating the slide, pressure jaws, member and rolls.

6. In a device of the character described provided with a stock container for delivering fastening elements into a chute having an outlet, the combination of a chute for guiding said fastening elements from said container to said outlet, said chute being so constructed and of such width for permitting said fastening elements to drop down therein in transverse position, with a bar transversely disposed to and adjacent said outlet at a predetermined distance, a reciprocable slide arranged on one side of said chute and movable longitudinally on said bar for forwardly moving one of said fastening elements when located on said bar, pressure jaws positioned on the other side of said chute, a pair of rolls adjacent said jaws for intermittently moving a band in a horizontal plane transversely of said chute and said slide, said band projecting laterally beyond said rolls and providing a free edge upon which said fastening elements are to be fixed, means for intermittently actuating said slide on said bar, and a common plate for supporting said chute, said bar, said slide, said rolls and said jaws, said plate having a slot adapted for the passage of said band therethrough.

7. In a device of the character described provided with a receptacle for delivering fastening elements into a chute having an outlet; the combination of a chute for guiding said fastening elements in transverse position to said outlet, with a member fixedly located at a distance therefrom corresponding substantially to the maximum width of one of said elements and providing a track for the lowermost fastening element upon its withdrawal from said chute, said member extending transversely of said chute, a reciprocable part movable longitudinally on said member for forwardly moving said fastening element, clamping means adjacent said chute for securing said fastening element moved by said part beyond said chute, to a strip of material, and roller means adjacent said clamping means for intermittently moving said strip of material in a plane transversely of said chute.

8. In a device of the character described provided with a receptacle for delivering fastening elements into a chute having an outlet; the combination of a vertical chute adapted to receive said fastening elements in transverse position, with a member fixedly disposed adjacent said outlet and located at a distance therefrom corresponding substantially to the maximum width of one of said elements, said member and said outlet providing a channel extending transversely of said chute, a reciprocable part movable on said member longitudinally for forwardly moving a fastening element when located in said channel, clamping means adjacent said chute for securing said forwardly moved fastening element to a strip of material, means adjacent said clamping means for intermittently carrying said strip of material with its flat surface in a plane transversely of said chute, and means for intermittently actuating said part, said clamping means and said carrying means.

9. In a device of the character described provided with a receptacle for delivering fastening elements into a chute having an outlet; the combination of a vertically arranged chute adapted to slidably receive the fastening elements in transverse position, with a member horizontally disposed adjacent said outlet and fixedly located at a distance therefrom corresponding substantially to the maximum width of one of said elements, said member and said outlet providing a channel extending transversely of said chute, a reciprocable part movable on said member for forwardly moving a fastening element when located in said channel, and clamping means adjacent said chute for securing a fastening element moved by said part to a strip of material, said part and said clamping means being adjacent opposite sides of said chute, said strip being transported in a substantially horizontal plane.

10. In a device of the character described provided with a receptacle for delivering fastening elements into a chute having an outlet; the combination of a vertically arranged chute adapted to guidingly receive the fastening elements in transverse position, with a member spacedly and horizontally disposed adjacent said outlet, said member and said outlet providing a channel extending transversely of said chute, a reciprocable part movable longitudinally on said member for forwardly moving a fastening element when located in said channel, clamping means adjacent said chute for securing a fastening element moved by said part over said member to a strip of material, said part and said clamping means being substantially in alignment on opposite sides of said chute, and means movable for intermittent engagement with the lowermost fastening element in said chute for facilitating withdrawal thereof from said chute into said channel and in the path of said part, said strip moving in a direction perpendicular to that of said chute and said part.

JULIUS PÜSCHNER.
JOSEF PÜSCHNER.